March 9, 1937.   P. S. VOSBIKIAN ET AL   2,073,460
HEDGE SHEARS
Original Filed Oct. 25, 1934
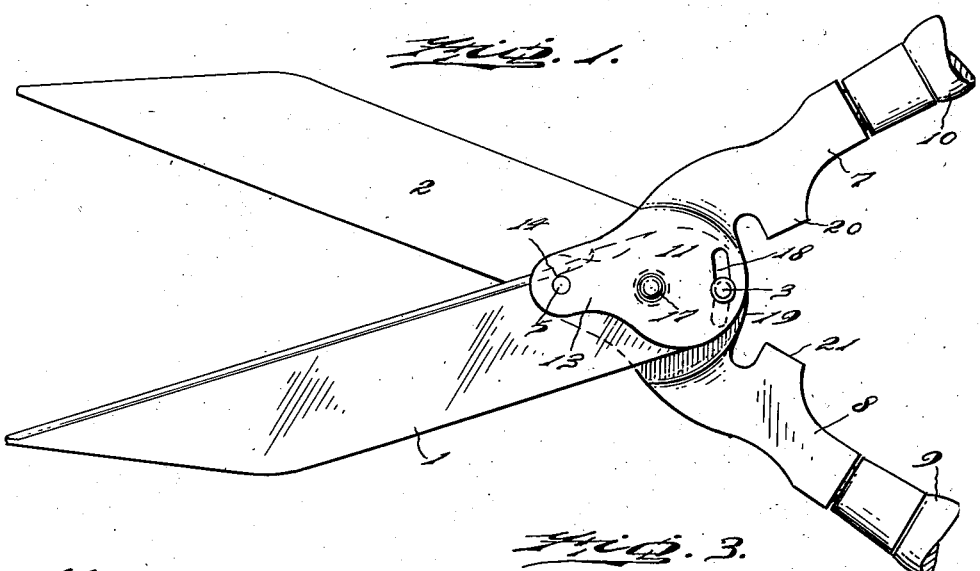
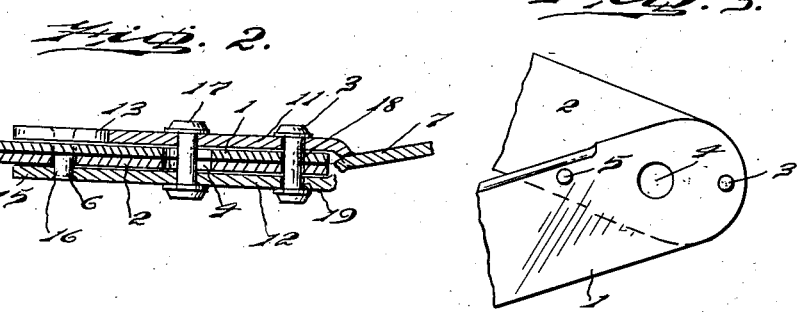
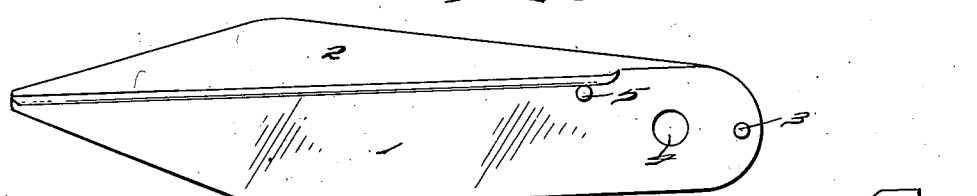
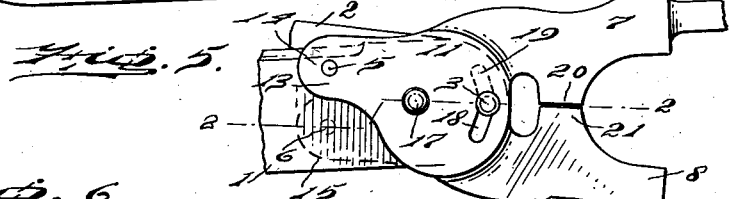
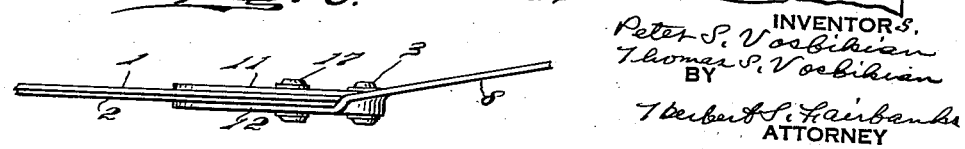
INVENTORS.
Peter S. Vosbikian
Thomas S. Vosbikian
BY
Herbert S. Fairbanks
ATTORNEY Patented Mar. 9, 1937

2,073,460

UNITED STATES PATENT OFFICE 2,073,460

HEDGE SHEARS

Peter S. Vosbikian and Thomas S. Vosbikian, Philadelphia, Pa.

Application October 25, 1934, Serial No. 749,869
Renewed August 7, 1936

2 Claims. (Cl. 30—11)

The object of our invention is to devise a novel construction and arrangement of hedge shears, wherein the cutting blade and handle members are constructed and connected together in a novel manner to provide a very efficient cutting action.

With the above and other objects in view as will hereinafter clearly appear our invention comprehends a novel construction of hedge shears.

It further comprehends a novel construction of hedge shears wherein the cutting blades are made separate from the handle members and are connected therewith in a novel manner.

It further comprehends novel cutting blades to which handle members are pivotally connected near a cutting edge, the handle members being pivotally connected in rear of their pivotal connection with the blades and the blades having a fixed pivot at their rear ends, with such pivot having a pin and slot connection with the handle members.

Other novel features of construction and advantage will hereinafter appear in the detailed description and the appended claims.

For the purpose of illustrating our invention, we have shown in the accompanying drawing, a preferred embodiment of it, which, in practice, will give satisfactory and reliable results. It is, however, to be understood that this embodiment is typical only and the various instrumentalities of which our invention consists can be variously arranged and organized, and the invention is not limited to the exact arrangement and organization of these instrumentalities as herein set forth.

Figure 1 is a top plan view of hedge shears, embodying our invention.

Figure 2 is a section on line 2—2 of Figure 5.

Figure 3 is a top plan view of a portion of the cutting blades.

Figure 4 is a top plan view of the blades in closed position.

Figure 5 is a top plan view of a portion of the shears with the blades closed.

Figure 6 is a side elevation of the hedge shears.

Similar numerals indicate corresponding parts.

Referring to the drawing:—

1 and 2 designate cutting blades of hedge shears, embodying our invention. The blades have cooperating bearing portions at their rear ends and are pivotally connected at their rear ends by a fixed pivot 3 of any desired or conventional construction. As illustrated this pivot is in the form of a screw and nut and washers. The bearing portions of the blades each have an opening 4. The blade 1 has near its cutting edge a fixed pivot pin 5 and the blade 2 near its cutting edge has a fixed pivot pin 6. 7 and 8 designate the handle members the shanks of which are connected with the grasping handles 9 and 10 respectively which are usually made of wood.

The handle member 7 is preferably offset to form a bearing portion 11, and in a similar manner the handle member 8 is offset to form a bearing portion 12.

The bearing portion 11 terminates in a forwardly extending arm 13 having an opening 14 to receive the pivot pin 5 of the blade 1, and, in a similar manner, the bearing portion 12 terminates in a forwardly extending arm 15 having an opening 16 to receive the pivot pin 6 of the blade 2.

The bearing portions 11 and 12 are pivotally connected by a fastening device 17 which passes freely through the openings 4 which latter are of greater diameter than that of the fastening device 17 to provide clearance for the novel movement of the blades during the cutting operation.

The bearing portion 11 of the handle member 7 has a cam slot 18 which is radial relatively to the pivot pin 5 of the blade 1. The bearing portion of the handle member 8 has a cam slot 19 which is radial with respect to the pivot pin 6.

Each handle portion is a counterpart of the other, except the shanks are bent in opposite directions so that, when the hedge shears are assembled, the cam slots 18 and 19 extend outwardly from the median line of the shears in opposite directions. The fixed pivot 3 extends through the cam slots 18 and 19.

The handle members are provided with stop members 20 and 21 which prevent the springing together of the handle shanks and grasping portions.

The fixed pivot at the rear end of the blades limits the extent of opening movement of the blades.

It will of course be understood that the pivot pins 5 and 6 may be fixed to either the handles or the blades and the operation will be the same in each case.

The handles turn on their fixed pivot formed by the fastening device 17. The blades turn on the pivots 5 and 6 and also on their fixed pivot 17. The pivot 17 forms with the handles a floating pivot for the blades which changes its position relative to the fixed pivot 3 of the blades during the opening and closing movement of the blades and also changes its position relatively to the pivot pins 5 and 6.

During the first portion of the closing movement of the blades a pull is exerted on the blades at the pivots 5 and 6 which is augmented during the final closing movement of the blades by a push exerted by the walls of the cam slots 18 and 19 against the fixed pivot 3 of the blades. This provides a cutting action which has been found to be very efficient in a device of this character.

The pivot pins 5 and 6 may be, as illustrated, in line with their respective handles.

It will now be apparent that we have devised a new and useful shears which embodies the features of advantage enumerated as desirable in the statement of the invention and the above description, and while we have, in the present instance, shown and described a preferred embodiment thereof, which will give in practice satisfactory and reliable results, it is to be understood that this embodiment is susceptible of modification in various particulars without departing from the spirit or scope of the invention or sacrificing any of its advantages.

Having thus described our invention what we claim as new and desire to secure by Letters Patent is:—

1. Hedge shears comprising cutting blades, having a fixed pivoted connection with each other at their rear ends, handle members having bearing portions between which the rear ends of the blades are positioned, a fixed pivot for the handle members passing through and having a clearance with the blades, said handle members having slots radially disposed with respect to the fixed pivot of the handle members, said slots extending in opposite directions from the median line of the blades and into which the fixed pivot of the blades extends, and each blade having a fixed pivotal connection with its handle member intermediate its forward end and the fixed pivot of the handle members.

2. Hedge shears comprising cutting blades each a counterpart of the other and having a fixed pivot at their rear ends, handle members each a counterpart of the other and having bearing portions between which the blades are positioned, a fixed pivot for the handle members, each of the blades having an opening through which the fixed pivot of the handle members passes and of greater diameter than that of such fixed pivot, cam slots in said bearing portions disposed radially of the fixed pivot of the handle members and into which the fixed pivot of the blades passes, and each of said handle members being pivoted at its forward end to its respective blades near the cutting edge of such blades.

PETER S. VOSBIKIAN.
THOMAS S. VOSBIKIAN.